W. E. HUBER.
METHOD OF BONDING RAILS.
APPLICATION FILED MAR. 26, 1914.
1,273,493.
Patented July 23, 1918.
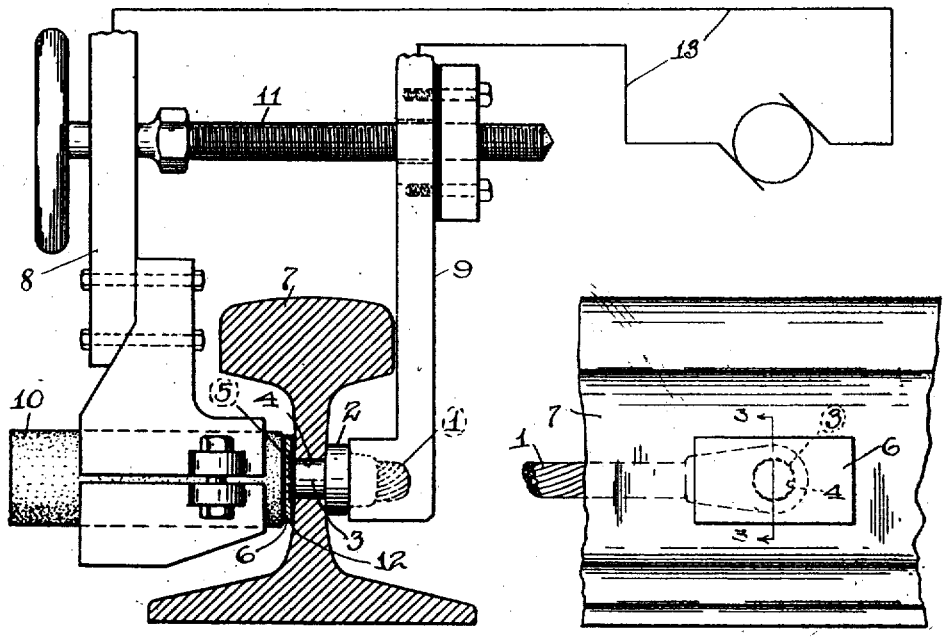
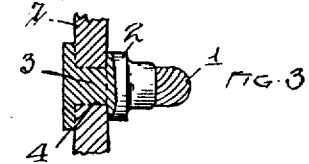
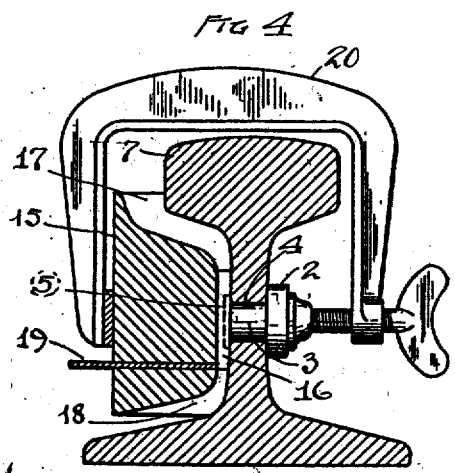
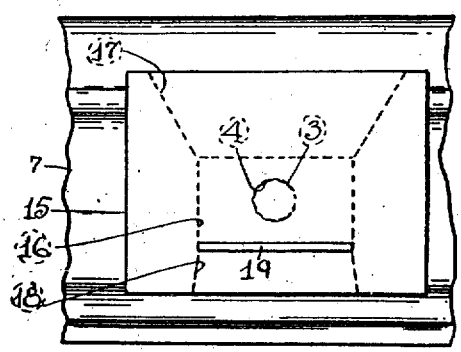
WITNESSES
O. M. Kappler
Thos. H. Fay
INVENTOR
William E. Huber
BY Fay and Oberlin
ATTORNEYS

UNITED STATES PATENT OFFICE.

WILLIAM E. HUBER, OF EAST CLEVELAND, OHIO, ASSIGNOR TO THE ELECTRIC RAILWAY IMPROVEMENT COMPANY, OF CLEVELAND, OHIO, A CORPORATION OF OHIO.

METHOD OF BONDING RAILS.

1,273,493.  Specification of Letters Patent.  Patented July 23, 1918.

Application filed March 26, 1914. Serial No. 827,490.

*To all whom it may concern:*

Be it known that I, WILLIAM E. HUBER, a citizen of the United States, and a resident of East Cleveland, county of Cuyahoga, and State of Ohio, have invented a new and useful Improvement in Methods of Bonding Rails, of which the following is a specification, the principle of the invention being herein explained, and the best mode in which I have contemplated applying that principle, so as to distinguish it from other inventions.

As is well known, it is necessary where the traction rails of an electric railway are used as the return circuit, as well as in connection with the third rails of third rail systems, to so join together the abutting ends of the steel rails as to bring the electrical conductivity of the joints up to the required degree. An approved method of so "bonding" such rails is to connect across the joints more or less flexible conductors of copper, which allow the rails to contract and expand under the influence of changes in temperature, while at the same time such bonds, being of highly conductive material may be of relatively small cross-section and correspondingly inconspicuous.

A method of bonding that has quite generally prevailed, at least until of recent years, involves the use of so-called "bonds" consisting of a flexible body, usually of stranded material, having terminals in the form of plugs adapted to be inserted and expanded in apertures in the web of the rail. Experience has demonstrated that bonds of this type are not satisfactory because no matter how well the contacting surfaces of the aperture and bond terminal be cleaned, or how tightly such terminal be driven into and expanded in such aperture, oxidation will set in and the electrical conductivity of the joint be materially reduced, if not destroyed. Accordingly the so-called "Herrick" process whereby the bond terminals are homogeneously united by welding to the rails, has more or less superseded the older method just described. There nevertheless have been installed large numbers of such older type of bonds, and, where these have lost their efficiency, it is obviously a considerable expense to replace them either with others of the same type or with the superior welded type.

The present improvements accordingly have as their object to provide a method whereby bonds of the aforesaid socket-connected type may be restored to usefulness without being replaced, thus enabling the conductivity of the return circuit to be brought up to par again. To the accomplishment of the foregoing and related ends, the invention, then, consists of the steps hereinafter described and particularly pointed out in the claims.

The annexed drawing and the following description set forth in detail certain steps adapted for carrying out the invention, such disclosed steps constituting, however, but one of various ways in which the principle of the invention may be used.

In said annexed drawing:—

Figure 1 is a transverse sectional view of a rail showing the terminal of a bond of the socket-connected type attached thereto, and also showing, in more or less diagrammatic form, an arrangement of apparatus suitable for carrying on the present improved process of bonding; Fig. 2 is a side elevational view of such rail with a completed bond attached, or restored, in accordance with the present improved process; Fig. 3 is a transverse vertical section of such completed bond with adjacent portions of the rail taken on the plane indicated by the line 3—3, Fig. 2; Fig. 4 is a transverse section corresponding with Fig. 1, but showing an alternative arrangement of apparatus; and Fig. 5 is a side elevational view of such alternative apparatus as viewed from the left in Fig. 4.

As has been already explained, the socket-connected type of bond usually comprises a stranded, flexible body portion 1, which terminates in a solid head 2 formed with a lateral stud or pin 3 that is adapted to be inserted in a suitable aperture 4 in the rail. This aperture is shown in the web of the rail in the illustrative constructions shown in the drawing, and extends entirely through such web so as to permit the end of the stud or pin to be engaged by suitable compressing means which tend to form more or less of a head 5 on such pin, (shown in dotted outline only in Figs. 1 and 4), whereby such pin is supposed to be held more securely in the aperture, and the contacting surfaces of the aperture and pin be preserved against the entrance of moisture. Despite the foregoing and other precautions, as explained above, oxidation does taken place in the joint, and the effective electrical contact of the terminal with the rail is thereby so reduced as to render the bond substantially worthless, although the body may be still intact and a satisfactory conductor.

According to the present process I propose to weld a plate 6 or like metal shape of suitable conducting material, preferably of copper, to the end of the stud or pin 3 and the adjacent face of the rail 7. Preparatory to welding such plate in the fashion just described, I cut or grind off the upturned end 5 of the pin which projects beyond the rail face, so as to leave such end flush with the latter, and at the same time I grind off such face so as to leave a bright surface of suitable area surrounding the pin. Thereupon a plate 6 of proper size and thickness is welded simultaneously to the end of the pin and such clean rail face. As a result it will be seen that a welded joint is in effect provided between the bond terminal and the rail, although on the opposite side of the rail web, or corresponding rail part, from such terminal. A joint thus constructed will last indefinitely, or in other words, as long as the body of the bond which usually outlasts the rail itself, where not subjected to unusual wearing conditions or strains.

To thus weld the plate to the rail face and bond terminal I preferably employ the method of making homogeneous mechanical junctures described and claimed in United States Patent No. 1,041,281, to A. B. Herrick, dated October 15, 1912, although my general process is not limited necessarily to any specific process of welding. Where such method is utilized, a suitable clamping device will be employed such as shown in Fig. 1, comprising two movable members or arms 8 and 9, one of which carries a block 10 of high resistance material such as carbon, the other of which has its end formed to contact with and press against the outer face of the bond terminal, as clearly shown in the figure of reference. The block is adjusted so that when the clamp arms are drawn together as by means of the screw 11, the plate 6 of copper or equivalent material, which is to be welded as aforesaid to the rail face and end of the terminal pin, will be pressed against such face and end with the necessary pressure. It will be understood that the cross-sectional area of the block is substantially equal to that of the plate, so as to more or less completely cover the outer face thereof. The inner face of the plate, moreover, is desirably covered with a sheet 12 of braze or equivalent material to assist in forming a junction of the necessary homogeneity.

With the foregoing apparatus in place as just described and shown in Fig. 1, if a heating electric current be passed through the circuit 13 including the clamp arms 8 and 9 and the electrode 10, the latter will be raised to a temperature sufficiently high to bring the plate to the welding point. The latter having a relatively high heat conductivity, conducts the heat thus received to that portion of the rail surface with which its other face contacts, as well as to the end of the bond terminal pin, so that such surface and pin end are brought to a welding temperature practically simultaneously with the plate. At the same time, owing to the pressure exerted by the clamp arms 8, the material of the plate, as soon as it becomes sufficiently plastic, is pressed forcibly against such surface and end, the latter being held against displacement by the other arm 9. In this way the plate is quickly and thoroughly welded, so that the current may be shut off and the clamp arms removed, leaving the plate terminal attached as shown in Figs. 2 and 3.

Instead of using such "Herrick" process to weld the plate to the rail and bond terminal end, I may employ the so-called "Wherry" process, being that described and claimed in United States Patent No. 750,510, to W. H. Wherry, dated January 26, 1904. In utilizing this process I employ a mold 15 of refractory material adapted to conform with that side of the rail to which the plate 6 is designed to be attached, the adjacent face of the mold being formed with a shallow chamber 16 of the same shape and size as such plate. Communicating with the upper and lower ends of this space are sprues 17 and 18, respectively, the first of which allows molten metal to be poured into the chamber, while the latter allows such metal to escape, a slidable plate 19 of steel or the like serving as a gate to shut off such escape and confine the metal to the chamber when desired. One or more clamps 20 of familiar U-shape are conveniently used to hold the mold in proper place against the rail.

With the above described apparatus properly disposed, the end of the bond terminal pin and the surrounding portion of the rail face being preferably cleaned as before, a quantity of molten copper is poured into the sprue 17 and allowed to pass through the same and out the other sprue, until such bond-terminal pin and rail face have been raised to the proper temperature at which a homogeneous union will be formed with the copper. Thereupon the gate 19 is closed and the pouring of the molten copper continued until the chamber 16 is filled. The mold is then removed, after a sufficient time has elapsed to allow the copper in the chamber to harden or set. The result is the provision of a plate, which is firmly united directly to the rail face and to the end of the bond-terminal pin projecting through the aperture, so that the conductivity of the bond is restored as before.

Whichever specific mode of attachment be employed, it will be obvious that a plate 6, or like element thus welded to the bond terminal and the rail will serve to restore the bond to use and render the same, if anything, even more efficient than originally. It will furthermore be understood that the element herein referred to as a "plate" for convenience, may take on a variety of forms, and need not be of the flat plate-like form shown. So, too, while copper has been spoken of as the material composing the bond, as well as such plate, obviously any other metal as for example aluminum, suitable for use in the connection in hand may be employed equally as well. In conclusion, it should be explained that while my improved process is particularly useful in restoring or repairing socket-connected bonds which have become impaired, there is no reason why bonds should not be initially affixed in this way, if found desirable for any reason.

Other modes of applying the principle of my invention may be employed instead of the one explained, change being made as regards the steps herein disclosed, provided the steps stated by any of the following claims or the equivalent of such stated steps be employed.

I therefore particularly point out and distinctly claim as my invention:—

1. The method of homogeneously uniting a plug bond to a rail to which it is mechanically attached by having its terminal portion inserted through an aperture therein, which consists in bringing the end face of the bond terminal into the plane of the adjacent rail surface, pressing a metal plate against such end face of the terminal and adjacent rail surface, and thereupon applying heat from an external source to such plate, whereby the latter is simultaneously welded to such terminal and adjacent rail surface.

2. The method of homogeneously uniting a plug bond to a rail to which it is mechanically attached by having its terminal portion inserted through an aperture therein, which consists in bringing the end face of the bond terminal into the plane of the adjacent rail surface, pressing a metal plate against such end face of the terminal and adjacent rail surface by means of an electrode of high resistance, and then passing a heating electric current through such electrode, such current being adapted to produce a high temperature in said electrode, whereby such plate is simultaneously welded to such terminal and adjacent rail surface.

3. The method of homogeneously uniting a plug bond to a rail to which it is mechanically attached by having its terminal portion inserted through an aperture therein, which consists in pressing a properly formed plate into contact with the end face of the terminal and adjacent rail surface, and thereupon applying heat from an external source to such plate, whereby the latter is simultaneously welded to such terminal and adjacent rail surface.

4. The method of homogeneously uniting a plug bond to a rail to which it is mechanically attached by having its terminal portion inserted through an aperture therein, which consists in simultaneously heating the end of the terminal and the adjacent rail surface and thereupon homogeneously uniting thereto a metal plate, thereby uniting the terminal, the plate and the rail into an integral structure.

Signed by me, this 24th day of March, 1914.

WILLIAM E. HUBER.

Attested by:—
A. L. GILL,
JNO. F. OBERLIN.